Jan. 12, 1926.
J. E. LEE
1,569,761
FIGURE WHEELED TOY
Filed Sept. 8, 1924
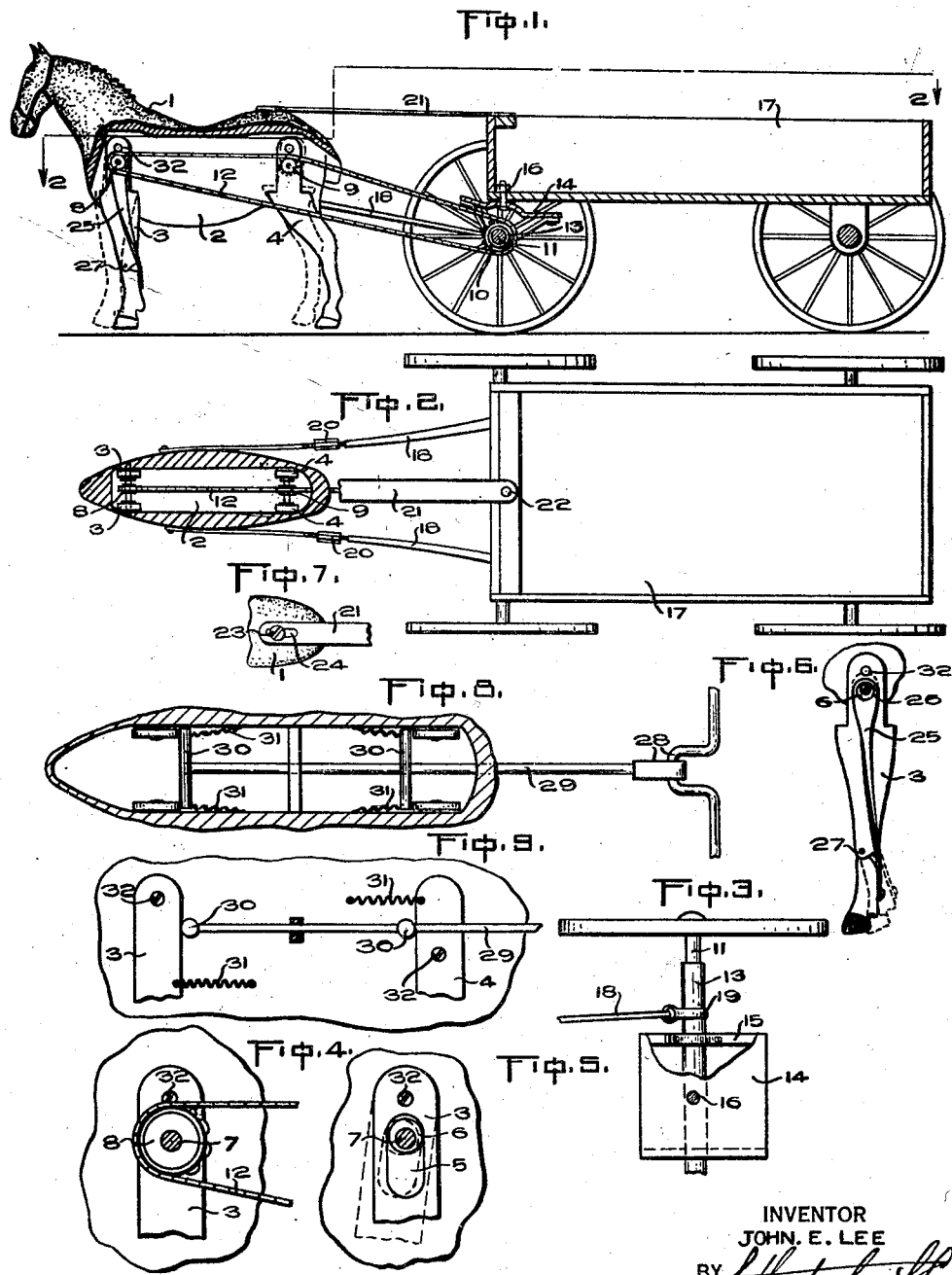
INVENTOR
JOHN. E. LEE
BY
ATTORNEYS Patented Jan. 12, 1926.

1,569,761

UNITED STATES PATENT OFFICE.

JOHN EDMOND LEE, OF BUFFALO, NEW YORK.

FIGURE WHEELED TOY.

Application filed September 8, 1924. Serial No. 736,635.

*To all whom it may concern:*

Be it known that I, JOHN EDMOND LEE, a subject of the King of Great Britain, and a resident of the city of Buffalo, county of Erie, in the State of New York, United States of America, have invented certain new and useful Improvements in Figure Wheeled Toys, of which the following is a full, clear, and exact description.

My invention relates to the improvements in children's toys, and the object of the invention is to construct a combined horse and wagon, in which the forward movement of the wagon will give the horse a walking or trotting motion.

A further object is to devise means whereby the knee joint of each foreleg of the horse bends as the leg is moved, and a still further object is to devise means for tensioning the driving connection between the wagon and the horse.

My invention consists of a device constructed and arranged all as hereinafter more particularly described and illustrated in the accompanying drawing in which:

Fig. 1 represents a longitudinal vertical section of my device partly in elevation.

Fig. 2 is a plan sectional view thereof, through the line 2—2, Fig. 1.

Fig. 3 is an enlarged plan view of a broken away portion of the front axle plate and king bolt therefor.

Fig. 4 is a fragmentary view of the upper portion of one of the front legs showing the driven sprocket which rotates the leg actuating mechanism and also the chain which connects the sprocket with the front axle of the wagon.

Fig. 5 is a similar view to Figure 4, the chain and sprocket wheel being removed.

Fig. 6 is an enlarged elevational view of one of the forelegs showing the means for actuating the foreleg.

Fig. 7 is a plan view of the rump portion of the horse showing the strap which connects the horse to the wagon, attached thereto.

Fig. 8 is a horizontal sectional view of an alternate form of construction for actuating the legs of the horse, and Fig. 9 is a fragmentary side elevational view thereof.

Like characters of reference indicate corresponding parts in the different views.

1 is the horse having the hollow interior 2. 3 and 4 are the front and back legs respectively which are pivotally mounted on the side walls of the hollow interior 2 of the horse by means of the pins 32. 5 are slots provided in the vicinity of the upper ends of the legs, and adapted to receive the cams 6 mounted upon the horizontal transverse spindles 7 which extend across the hollow interior 2 of the horse, being rotatably mounted in the side walls thereof.

8 and 9 are sprocket wheels mounted respectively on the front and rear spindles 7, and 10 is a sprocket wheel mounted upon the live front axle 11 of the wagon. 12 is an endless chain passing around the sprockets. The axle 11 is freely mounted in the housing 13, the plate 14 being secured thereto by means of the straps 15, and 16 is the king bolt connecting the plate 14 to the wagon 17. 18 are a pair of forwardly extending braces, their rear ends being connected to the housing 13 by means of the straps 19 and their forward ends suitably secured to the shoulders of the horse. The braces 18 are provided with turnbuckles 20 which permit the horse being adjusted in relation to the wagon for tensioning the chain 12. 21 is a strap or brace, its rear end being pivotally mounted on the front of the wagon by the pin 22, and its forward end adjustably secured to the back of the horse by means of the screw 23 which passes through the slot 24 in the forward end of such strap.

For actuating the lower portions of the forelegs of the horse I provide metal strips 25 on the inside of the legs, the upper ends of which are provided with circular orifices 26 through which the outer ends of the respective cams 6 pass, the lower ends of the strips being bent around to the back of the legs and secured to the backs of the respective lower portion of the forelegs, which are pivotally secured to the upper part of the forelegs by means of pins 27.

In the alternative construction shown in Figures 8 and 9 instead of the sprockets and chain I provide a crank 28 on the front axle to which is connected the forwardly extending rod 29 which runs into the hollow body of the horse, such rod being provided with the laterally extending members 30, which actuate the legs when the member 29 is reciprocated by the crank 28. 31 are spiral springs for restoring the legs to their initial position when they are moved forward or backwards as the case may be by the members 30.

The operation of my device is as follows: When the wagon is moved forwardly by the child the sprocket 10 on the live front axle 11 will be rotated, thus rotating the sprockets 8 and 9 by means of the chain 12. As such sprockets are secured upon the spindles 7 which carry the cams 6, such cams will be rotated in the slots 5 in the upper ends of the legs, thus causing the legs to swing about the pins 32 as is clearly shown in Figure 5. The rotation of the cams will also reciprocate the strips 23 on the inside of the legs in a vertical direction thus causing the lower portions of the forelegs to swing to and fro as illustrated in Figure 6.

Upon desiring to adjust the tension of the chain 12 it is merely necessary to slacken the screw 23 which secures the strap 21 to the horse, and adjust the distance between the horse and the wagon by means of the turnbuckles 20 on the braces 18. When this is done the screw 23 is tightened down to lock the horse in position relatively to the wagon.

From the above description it will be seen that I have devised a simply operated toy which can be cheaply constructed, and which will give a very realistic demonstration of the movement of the paces of a horse.

What I claim as my invention is:

In a figure wheeled toy, the combination with a horse and wagon, of slotted swingable legs on the horse, rotatable spindles mounted in the interior of the horse and adapted to pass through the slots in the legs, cams on the spindles adapted to rotate in the slots to swing the legs, lower foreleg portions jointed on the swingable upper foreleg portions, lower foreleg actuating strips having orifices in their upper ends into which the leg actuating cams are inserted, means for securing the lower ends of the strips to the lower forelegs so that they have a swinging movement as the strips are reciprocated by the rotatable movement of the cams.

JOHN EDMOND LEE.